(12) United States Patent
Baize

(10) Patent No.: US 11,893,692 B1
(45) Date of Patent: Feb. 6, 2024

(54) SYSTEMS AND METHODS FOR RETEXTURIZING MESH-BASED OBJECTS USING POINT CLOUDS

(71) Applicant: Illuscio, Inc., Culver City, CA (US)

(72) Inventor: DonEliezer Baize, Los Angeles, CA (US)

(73) Assignee: Illuscio, Inc., Culver City, CA (US)

(*) Notice: Subject to any disclaimer, the term of this patent is extended or adjusted under 35 U.S.C. 154(b) by 0 days.

(21) Appl. No.: 18/326,853

(22) Filed: May 31, 2023

(51) Int. Cl.
G06T 17/20 (2006.01)
G06T 7/11 (2017.01)

(52) U.S. Cl.
CPC ........... G06T 17/205 (2013.01); G06T 7/11 (2017.01); G06T 2207/10028 (2013.01); G06T 2207/20104 (2013.01)

(58) Field of Classification Search
CPC ......... G06T 17/20; G06T 19/20; G06T 17/00; G06T 2207/10028; G06T 17/205; G06T 9/001; G06T 15/08; G06T 2207/20084; G06T 2210/36; G06T 2215/16; G06T 2219/2016; G06T 2219/2021; G06T 7/55; G06T 9/00; G06T 1/0007; G06T 15/00; G06T 15/04; G06T 19/00; G06T 19/006; G06T 2200/04; G06T 2200/08; G06T 2207/20016; G06T 2207/20076; G06T 2207/20081; G06T 7/11; G06T 7/194; G06T 7/251; G06T 7/344; G06T 7/50; G06N 3/045; G06N 3/02; G06V 10/82; G06V 20/64

See application file for complete search history.

(56) References Cited

U.S. PATENT DOCUMENTS

2019/0035150 A1* 1/2019 Owechko ............... G06T 17/20
2022/0292765 A1* 9/2022 Le ........................ G06N 3/045

* cited by examiner

Primary Examiner — Xiao M Wu
Assistant Examiner — Scott E Sonners
(74) Attorney, Agent, or Firm — Ansari Katiraei LLP; Arman Katiraei; Sadiq Ansari

(57) ABSTRACT

Disclosed is a graphics system and associated methodologies for selectively increasing the level-of-detail at specific parts of a mesh model based on a point cloud that provides a higher detailed representation of the same or similar three-dimensional ("3D") object. The graphics system receives the mesh model and the point cloud of the 3D object. The graphics system determines a region-of-interest of the 3D object based in part on differences amongst points that represent part or all of the region-of-interest. The graphics system reconstructs the region-of-interest in the mesh model and generates a modified mesh model by modifying a first set of meshes representing the region-of-interest in the mesh model to a second set of meshes based on the positional elements of the point cloud points. The second set of meshes has more meshes and represents the region-of-interest at a higher level-of-detail than the first set of meshes.

20 Claims, 7 Drawing Sheets

SYSTEMS AND METHODS FOR RETEXTURIZING MESH-BASED OBJECTS USING POINT CLOUDS

BACKGROUND

Graphics hardware and software are highly optimized for mesh-based graphics. For instance, the graphics hardware and software are optimized to process, manipulate, and render geometry meshes that form and/or define a two-dimensional ("2D") or three-dimensional ("3D") object as a connected set of triangles or other polygons.

Point clouds represent a significant leap in graphical fidelity relative to the geometry meshes. The same surface that is represented by a single planar polygon in a geometry mesh may be represented with multiple points in a point cloud. The multiple points are independently positioned in a 3D space to give that surface more depth, dimensionality, detail, and realism than the flattened planar polygon.

However, since the graphics hardware and software have been optimized for geometry meshes instead of point clouds, working with point clouds is significantly more resource and computationally expensive than working with geometry meshes. In other words, a particular object represented as a point cloud consumes more memory and requires more time to process, manipulate, and render using existing graphics hardware and software than the same particular object represented at the same level-of-detail, at the same resolution, and/or with equal amounts of data with a mesh model. Accordingly, there is a need to incorporate the depth, detail, dimensionality, and/or realism of point clouds into geometry meshes and/or mesh models while retaining compatibility with hardware and software that is highly optimized for mesh processing, manipulation, and/or rendering.

DETAILED DESCRIPTION OF PREFERRED EMBODIMENTS

The following detailed description refers to the accompanying drawings. The same reference numbers in different drawings may identify the same or similar elements.

Provided are systems and methods for retexturizing mesh-based objects using point clouds. Retexturizing the mesh-based objects includes using a point cloud representation of a three-dimensional ("3D") object to detect and add detail in specific regions-of-interest of a mesh-based representation of the same or similar 3D object.

The retexturizing is implemented by a graphics system. The graphics system aligns the point cloud representation with the mesh-based representation of the same 3D object, and analyzes the point cloud representation of the 3D object to detect the regions-of-interest where the 3D object has greater positional variety and/or other non-uniformity relative to other regions of the point cloud representation or relative to the same regions in the mesh-based representation. The graphics system selects the triangles, polygons, or meshes that represent the regions-of-interest in the mesh-based representation, and reconstructs the regions-of-interest by defining additional triangles, polygons, or meshes to more closely recreate the depth or complex form of the regions-of-interest according to the positioning of the point cloud points for those regions-of-interest. In some embodiments, the graphics system generates the mesh-based representation via a first sampling of points from the point cloud representation, detects the regions-of-interest, and increases the resolution for the mesh-based representation at the regions-of-interest by sampling a greater number of points with which to define smaller but greater number of meshes for the regions-of-interest.

The graphics system incorporates additional depth, dimensionality, detail, and realism from point clouds into the mesh models representing the same or similar 3D objects. In doing so, the graphics system increases the depth, dimensionality, detail, and realism of the geometry meshes from which the mesh models are defined while retaining the meshes and/or data format that are directly compatible with and/or supported by optimized graphics hardware and software. Consequently, the graphics system modifies the mesh models to more accurately represent the complex forms and shapes of the 3D object in the identified regions-of-interest while still allowing those regions-of-interest and other parts of the mesh models to be processed, manipulated, and/or rendered with the same efficiencies as other object models that are defined with meshes.

Figure 1:
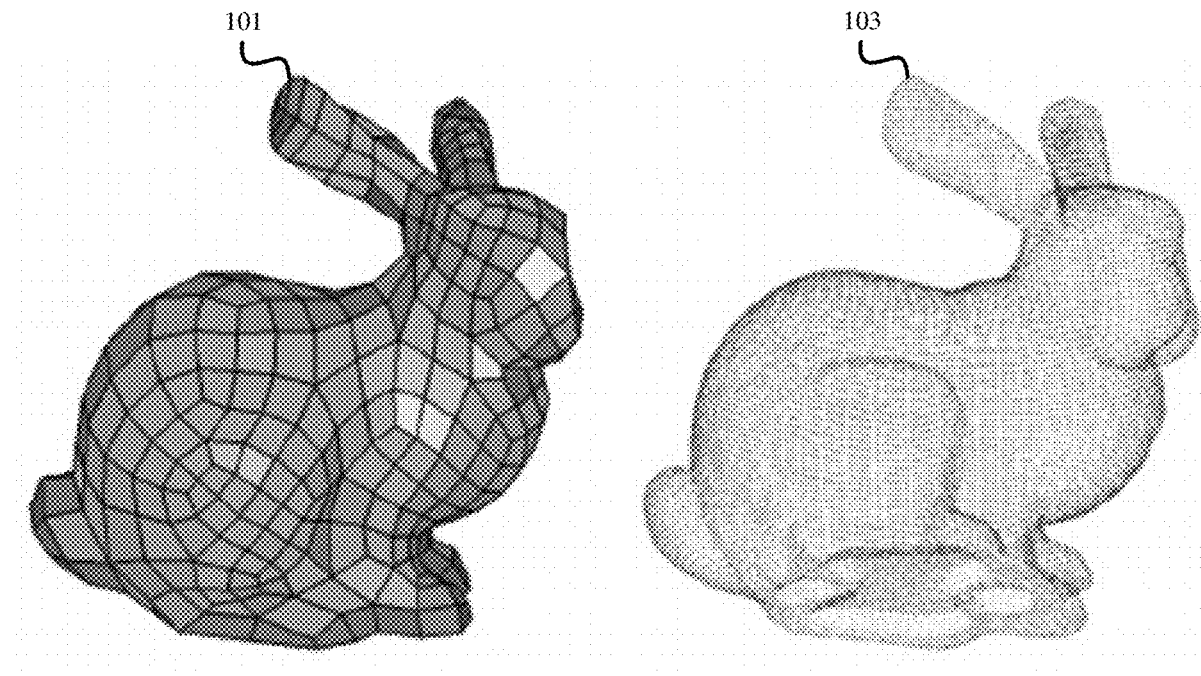
FIG. 1 illustrates an example of a mesh-based representation and a point cloud representation of a same three-dimensional ("3D") object in accordance with some embodiments presented herein.

FIG. 1 illustrates an example of a mesh-based representation and a point cloud representation of a same 3D object in accordance with some embodiments presented herein. Mesh-based representation 101 is defined as a geometry mesh and may be created from or independent of point cloud representation 103. Point cloud representation 103 is defined as a set of points that are distributed in a 3D space.

Mesh-based representation 101 constructs the shape and form of the 3D object with a set of triangles, polygons, or other meshes. Each mesh is flattened plane that spans a region between a set of vertices. Each vertex may be shared or used for defining two or more meshes. Each mesh may be defined with a set of positional coordinates that correspond to the positions for each of the mesh vertices.

The resolution of mesh-based representation 101 is defined by the number of meshes and the size of each mesh used to construct the shape and form of the 3D object. Fewer meshes that are larger in size produce a lower resolution or lower detailed model of the 3D object than more smaller-sized meshes. Specifically, the smaller-sized meshes are able to capture more of the contours, depth, angles, and complex forms of the 3D object than the larger-sized meshes. For instance, a particular region of a 3D object may be represented with a significant loss of detail when there is an angled protrusion inwards or outwards at the center of the particular region and a single flatted mesh represents the particular region in mesh-based representation 101. However, if the same particular region is represented with two or more meshes, then the two or more meshes may be defined with vertices that capture the angled protrusion.

In any case, each mesh is a planar surface that spans a region of space between its vertices. In other words, the region of space between the vertices is represented with a single triangle, polygon, or other planar shape. Each mesh therefore uniformly represents the region of space between its vertices even when the represented region of the 3D object has positional variety, is textured, has varying depths, and/or has other structural non-uniformity (e.g., differs from the flat planar surface of the mesh that represents that region of space in the geometry mesh of mesh-based representation 101).

Point cloud representation 103 represents the same object as a disconnected set of points that are distributed in a 3D space. The points of point cloud representation 103 differ from pixels of a two-dimensional ("2D") image, because certain regions of point cloud representation 103 have no points, lower densities of points, and/or higher densities of points based on varying amounts of visual information that is detected, scanned, or created at those regions. Additionally, the position of the point cloud points are defined in a 3D space using x, y, and z coordinate values. In contrast, pixels of a 2D image are defined in a 2D space and have a uniform density or fixed arrangement that is defined by the resolution of the 2D image. In other words, the point cloud points have a non-uniform placement or positioning, whereas the 2D image has pixel data for each pixel of a defined resolution (e.g., 640×480, 800×600, etc.).

Each point cloud point is defined with a plurality of elements. The plurality of elements may include a first set of positional elements and a second set of non-positional or descriptive elements. Values for the positional elements and/or non-positional elements of a particular point may be calculated from the return intensity of the light, laser, or signal reflecting off that particular point and returning to the scanning device.

The positional elements include coordinates within a 3D space. For instance, each point cloud point includes x-coordinate, y-coordinate, and z-coordinate elements to capture the position of a corresponding physical point from a surface or feature of the modeled 3D object. The positional elements may further include a surface normal. The surface normal defines the angle, direction, or orientation that the surface or feature represented by the point faces or is exposed to. More specifically, the surface normal is a line, ray, or vector that is perpendicular to the scanned surface or feature represented by the point. In some embodiments, the positional elements may be defined for created points as opposed to points that are scanned from a physical surface of a 3D object.

The non-positional elements include information about the detected characteristics of the surface or feature at a corresponding position of the 3D object. The characteristics may correspond to a detected color. The color may be represented using red, green, blue ("RGB"), and/or other color component values. In some embodiments, a point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface or feature. In some embodiments, the non-positional elements directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic". These material properties may be associated with different values for the chrominance, hardness, translucence, reflectivity, luminance, and/or other visual characteristics of the point defined with a material property.

Each point of point cloud representation 103 represents a smaller part of the 3D object that a corresponding mesh of mesh-based representation 101. In other words, the region of the 3D object that is spanned or represented by a single mesh of mesh-based representation 101 may be represented by multiple points of point cloud representation 103. The points may be positioned independent of one another and at different depths to give that region of the 3D object more depth, dimensionality, detail (e.g., resolution), and/or realism than the corresponding mesh from mesh-based representation 101.

Point cloud representation 103 therefore provides a more detailed, higher resolution, and more accurate model of the 3D object than mesh-based representation 101 when a greater number of points are used to represent the same surfaces or parts of the 3D object than meshes of mesh-based representation 101. However, the different formatting and/or structure of point cloud representation 103 are not compatible with or are not optimized for much of the existing graphics hardware and/or software hardware. Consequently, the points of point cloud representation 103 are edited, manipulated, rendered, and/or otherwise processed more slowly and with greater resource usage than the triangles, polygons, and/or other meshes of mesh-based representation 101 using existing graphical processing units ("GPUs") and/or other hardware as well as existing image processing, manipulation, and rendering pipelines and/or other software.

Figure 2:
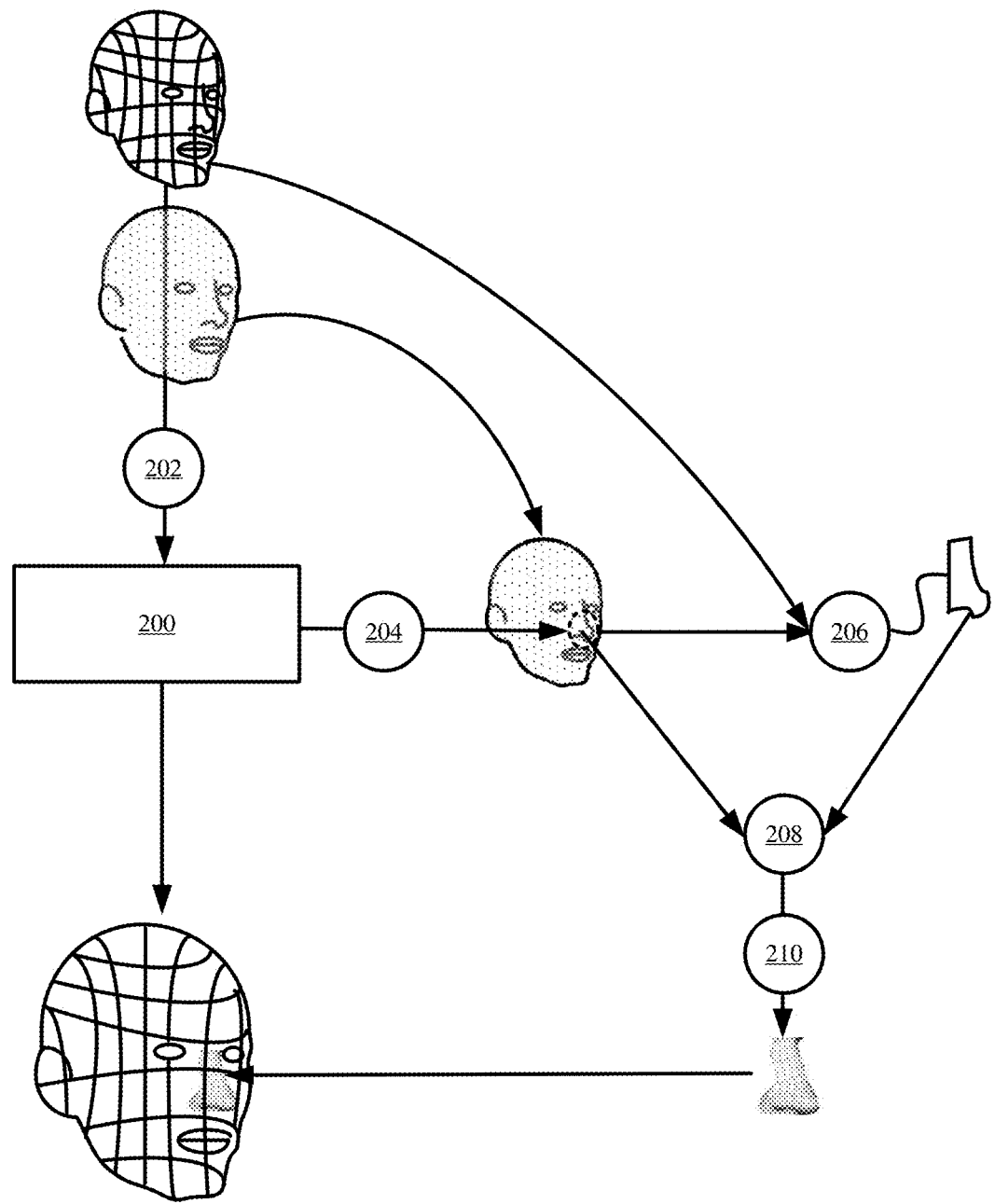
FIG. 2 illustrates an example of selectively increasing resolution of a mesh-based representation of a 3D object based on a point cloud representation of the 3D object in accordance with some embodiments presented herein.

FIG. 2 illustrates an example of selectively increasing resolution of a mesh-based representation of a 3D object based on a point cloud representation of the 3D object in accordance with some embodiments presented herein. Graphics system 200 receives (at 202) the mesh-based representation of the 3D object and a point cloud representation of the same 3D object. The 3D object may be a complex form with several contours, angles, depths, and/or differences that are inaccurately represented with a small set of larger meshes.

To simplify the example, the figure illustrates increasing the resolution for a single mesh of the mesh-based representation that represents a region-of-interest from the 3D object. Graphics system 200 selects (at 204) the region-of-interest by analyzing the point cloud data for a region within the point cloud with a high density of points, a set of points that have a large amount of positional variety (e.g., non-uniform depths, are positioned about multiple planes, etc.), and/or where a single mesh of the mesh-based representation deviates by at least a threshold amount from the positioning of the points from the point cloud that represent the same region of the 3D object.

Graphics system 200 selects (at 206) the single mesh that represents the selected (at 204) region-of-interest in the mesh-based representation. Graphics system 200 determines (at 208) an amount with which to increase the resolution of the single mesh based on the point cloud points that represent the region-of-interest in the point cloud. In some embodiments, graphics system 200 calculates a difference between the single mesh and the point cloud points representing the same region-of-interest for the 3D object. For instance, graphics system 200 may calculate the amount by which the position of the single mesh differs from the positions or the mean position of the point cloud points. In some other embodiments, graphics system 200 calculates the difference based on the positional variety amongst the point cloud points representing the region-of-interest. There is less positional variety when the point cloud points are positioned at similar depths or about a common plane, and there is more positional variety when the point cloud points are positioned about multiple different depths or planes. In still some other embodiments, graphics system 200 determines (at 208) the amount by which to reconstruct the single mesh representation of the region-of-interest based on the density, number, or distribution of the point cloud points representing the region-of-interest in the point cloud. Determining (at 208) the amount with which to increase the resolution of the single mesh or to reconstruct the single mesh representation may include determining the number of meshes that the single mesh should be partitioned into or the additional number of meshes with which to represent the same region-of-interest with a desired level-of-detail.

Graphics system 200 generates (at 210) a more detailed mesh representation for the region-of-interest by partitioning the single mesh into multiple meshes that reconstruct more of the angles, contours, detail, dimensionality, shapes, and/or complexities of the forms within the region-of-interest of the 3D object. Accordingly, graphics system 200 replaces the single mesh representing the region-of-interest in the mesh model with the multiple meshes.

In some embodiments, graphics system 200 generates (at 210) the multiple meshes according the positional elements of the point cloud points. For instance, the single mesh may be generated from selecting three point cloud points from the corresponding region-of-interest of the point cloud to define vertices of the single mesh, and generating (at 210) the more detailed mesh representation may include selecting additional point cloud points from the region-of-interest (e.g., more than three points) of the point cloud to define vertices of the multiple meshes for the increased resolution mesh representation of the region-of-interest.

In some other embodiments, graphics system 200 generates (at 210) the additional meshes without fixing the mesh vertices to the point positions. For instance, graphics system 200 may determine the minimum and maximum x, y, and/or z coordinate positions for the set of points representing the region-of-interest in the point cloud, and may define the vertices of the multiple meshes to span between the determined minimum and maximum positions.

In any case, the multiple meshes generated (at 210) in place of the single mesh represent the region-of-interest with more depth, detail, dimensionality, and at a higher resolution than the single mesh. Specifically, the single mesh is a single flat plane representation for the region-of-interest, whereas the multiple meshes may form complex 3D shapes with depth in different dimensions, multiple angles, and structural detail. In other words, the multiple meshes provide a multi-planar representation of the region-of-interest instead of the single flat plane representation provided with the single mesh.

Figure 3:
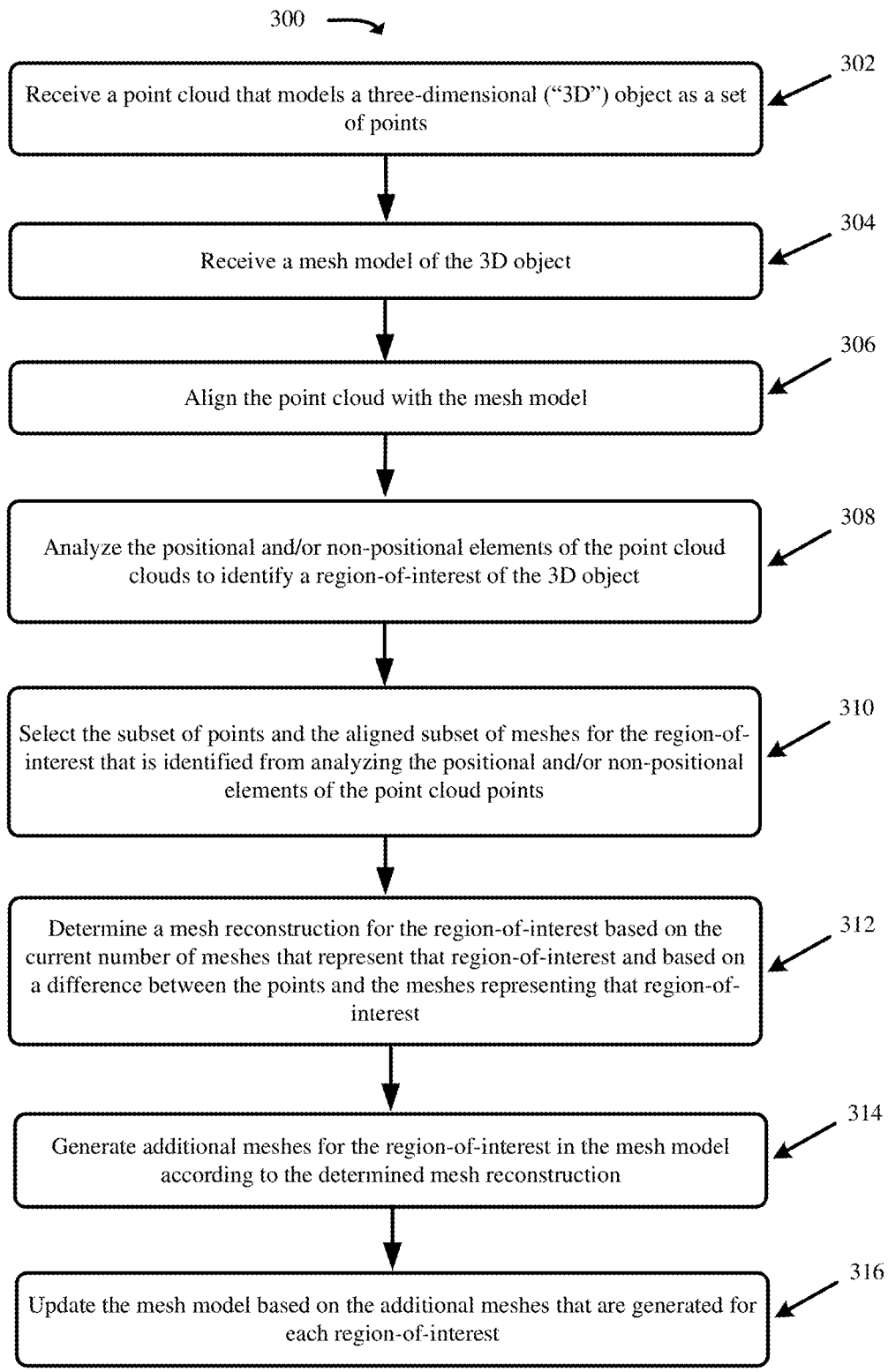
FIG. 3 presents a process for generating meshes to represent a particular region-of-interest from a 3D object using point cloud data in accordance with some embodiments presented herein.

FIG. 3 presents a process 300 for generating meshes to represent a particular region-of-interest from a 3D object using point cloud data in accordance with some embodiments presented herein. Process 300 is implemented by graphics system 200.

Graphics system 200 may include one or more devices or machines with processor, memory, storage, network, and/or other hardware resources used in generating visual graphics and/or graphics processing. Graphics system 200 may implement process 300 when generating a mesh-based representation of a 3D object, when post-processing the mesh-based representation, or at any time in between.

Process 300 includes receiving (at 302) a point cloud that models the 3D object as a set of points. Receiving (at 302) the point cloud may include scanning the 3D object using a Light Detection and Ranging ("LIDAR") scanner, structured light scanner, time-of-flight scanner, and/or other scanning device that measures and/or maps the positions about the surface of the 3D object to different points of the point cloud. Alternatively, receiving (at 302) the point cloud may include receiving a file from a previous scan of the 3D object.

Process 300 includes receiving (at 304) a mesh model of the 3D object. The mesh model is formed from a connected set of triangles, polygons, or other meshes. The mesh model is a geometry mesh or a wireframe structure that mirrors the shape and form of the 3D object with the connected set of meshes.

In some embodiments, receiving (at 304) the mesh model may include receiving the output that is generated from scanning or otherwise imaging the 3D object in the mesh format rather than the point cloud format. In some embodiments, the mesh model is generated from sampling a first subset of the point cloud points and defining the mesh vertices based on the positioning of the first subset of point cloud points. In any case, the mesh model and point cloud are different 3D representations of the same 3D object.

Process 300 includes aligning (at 306) the point cloud with the mesh model. Aligning (at 306) the point cloud with the mesh model includes identifying common points-of-reference or features in the mesh model and the point cloud, and resizing, rotating, scaling, and/or otherwise transforming one or more of the point cloud and the mesh model so that the identified common points-of-reference or features are at the same or similar positions.

The common points-of-reference or features may be identified from positional or structural commonality within the mesh model and the point cloud. For instance, graphics system 200 identifies sets of meshes and sets of point cloud points that form the same or similar structures at similar relative positions about the represented 3D object. In particular, graphics system 200 may perform edge detection, boundary detection, or feature recognition to align (at 306) the mesh model and the point cloud. In some embodiments, graphics system 200 may render each of the mesh model and the point cloud in order to perform the edge detection, boundary detection, or feature recognition.

The common points-of-reference or features may also be identified from non-positional or visual commonality within the mesh model and the point cloud. For instance, graphics system 200 identifies sets of meshes and sets of point cloud points that are defined with the same or similar color values at similar relative positions or over aligned regions about the represented 3D object.

Process 300 includes analyzing (at 308) the positional and/or non-positional elements of the point cloud clouds to identify a region-of-interest of the 3D object. A region-of-interest corresponds to high-detailed regions, high-density regions, and high-variation regions about the 3D object.

A high-detail region may correspond to a non-uniform part of the 3D object in which the color, depth, and/or structure changes between two or more values. A high-density region may correspond to a part of the 3D object that is represented by a greater number or denser concentration of points than other regions. A high-variation region may correspond to a part of the 3D object that has more color variety or structural variety than other parts of the 3D object.

In some embodiments, analyzing (at 308) the positional and/or non-positional elements may include voxelizing the point cloud into different partitioned regions that encompass different sets of the point cloud points. In some such embodiments, analyzing (at 308) the positional and/or non-positional elements further includes computing a standard deviation by which the depths, positions, colors, and/or other values of the points in a particular voxel differ from a mean that is computed from the same values of the points in the particular voxel. Graphics system 200 may also determine the positional distribution, color distribution, density, and/or arrangement or values for the points in a particular voxel to determine if those points satisfy a distribution threshold, density threshold, or other threshold for classifying the particular voxel as a region-of-interest.

In some other embodiments, graphics system 200 analyzes (at 308) the positional and/or non-positional elements relative of the point cloud points to the positioning and/or coloring of the meshes representing the same regions of the 3D object. For instance, graphics system 200 computes a mean position or a best-fit plane for the set of points in a particular region of the point cloud. Graphics system 200 computes the standard deviation between the mean position or the best-fit plane for the set of points and the one or more meshes representing the same particular region in the mesh-based representation. Graphics system 200 identifies a region-of-interest when the standard deviation is greater than a specified threshold. The standard deviation indicates the amount by which the mesh representation of the particular region differs from the point cloud representation of the particular region or the amount of detail from the point cloud representation of the particular region that is lost or is different in the mesh representation of the particular region. In some such embodiments, a region-of-interest corresponds to a set of meshes that differ by at least a threshold amount from and/or fail to capture a threshold amount of the detail as provided by a set of point cloud clouds for the same part of the 3D object.

Process 300 includes selecting (at 310) the subset of points and the aligned subset of meshes for the region-of-interest that is identified from analyzing (at 308) the positional and/or non-positional elements of the point cloud points. The selection includes two or more points from the point cloud that collectively represent the same part of the 3D object as one or more meshes from the mesh model.

Process 300 includes determining (at 312) a mesh reconstruction for the region-of-interest based on the current number of meshes that represent that region-of-interest and based on a difference between the points and the meshes representing that region-of-interest. Determining the mesh reconstruction includes computing an amount by which the form, shape, positioning, and/or structure of the region-of-interest represented by the selected subset of meshes differs from the form, shape, positioning, and/or structure of the region-of-interest represented by the selected subset of points. In some embodiments, graphics system 200 may use the computed standard deviation in order to determine (at 312) the mesh reconstruction. For instance, the mesh model may represent the shape and form of the 3D object with a certain number of meshes of a first size. Graphics system 200 may determine that the positioning of the points representing a first region-of-interest of the 3D object have a standard deviation from a mean position that exceeds a threshold by a first amount, and determines (at 312) a mesh reconstruction for the first region-of-interest that increases the number of meshes representing the first region-of-interest by 25% and that also reduces the mesh size by a corresponding amount based on the first amount by which the threshold is exceeded. Similarly, graphics system 200 may determine that the positioning of the points representing a second region-of-interest of the 3D object have a standard deviation from a mean position that exceeds the threshold by a greater second amount, and determines (at 312) a mesh reconstruction for the second region-of-interest that increases the number of meshes representing the second region-of-interest by 50% and that also reduces the mesh size by a corresponding amount based on the second amount by which the threshold is exceeded.

In some embodiments, determining (at 312) the mesh reconstruction for the region-of-interest includes selecting a second sampling of points from the point cloud from which to generate meshes that represent the particular region-of-interest in the mesh model. The second sampling of points is greater than and/or includes more point cloud points than the first sampling of points used to generate the subset of meshes that currently represent the particular region-of-interest. In some such embodiments, the second sampling of points may include points from the point cloud that become vertices for the mesh representation of that particular region-of-interest. More points are selected for the mesh reconstruction as the standard deviation or difference between the point cloud representation and mesh model representation of the particular region-of-interest increases.

Graphics system 200 may select points for the mesh reconstruction that preserve the maximum amount of detail in the particular region-of-interest. For instance, graphics system 200 may select the points in the particular region-of-interest of the point cloud that have maximum and minimum positional values or that represent other extreme positional values. Graphics system 200 uses the selected point to define additional meshes for the particular region-of-interest in the mesh model and/or to increase the detail or resolution of the mesh representation for the particular region-of-interest.

Process 300 includes generating (at 314) additional meshes for the region-of-interest in the mesh model according to the determined (at 312) mesh reconstruction. In some embodiments, generating (at 314) the additional meshes includes partitioning the existing meshes representing the region-of-interest into smaller sized meshes that connect via newly defined vertices. In some embodiments, generating (at 314) the additional meshes includes replacing the existing subset of meshes, and defining a greater number of meshes to represent the same region-of-interest based on a larger sampling of points from the point cloud representation of that particular region-of-interest.

Process 300 includes updating (at 316) the mesh model based on the additional meshes that are generated (at 314)

for each region-of-interest. Updating (at 316) the mesh model may include defining the mesh model with different sized meshes (e.g., smaller meshes for the region-of-interest and larger meshes for other regions that are not of interest) and/or with different numbers of meshes in different regions (e.g., more meshes for a more detailed representation of the region-of-interest and fewer meshes for a lesser detailed representation of the other regions that are not of interest).

Accordingly, updating (at 316) the mesh model may further include rendering the mesh model with the added meshes to present the additional detail that is preserved in the region-of-interest, or writing the updated mesh model to a file. Rendering the mesh model may include generating the 3D form of the 3D object based on the meshes of the updated mesh model, and colorizing or defining visual characteristics of the 3D object by placing one or more textures over the 3D form and rendering the one or more textures wrapped around the 3D form.

Figure 4:
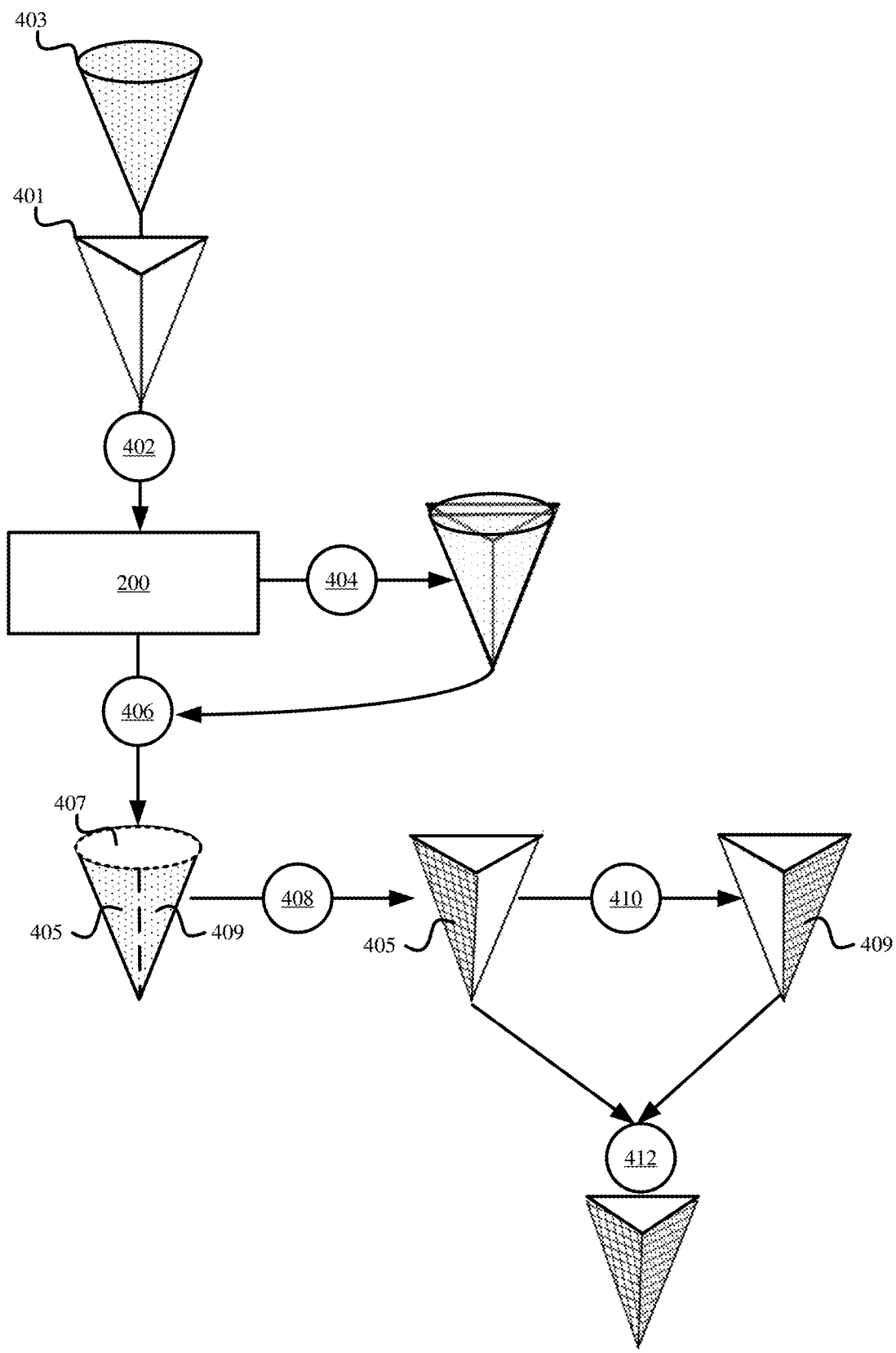
FIG. 4 illustrates an example of selectively increasing the detail at different regions of a mesh model in accordance with some embodiments presented herein.

FIG. 4 illustrates an example of selectively increasing the detail at different regions of a mesh model in accordance with some embodiments presented herein. Graphics system 200 receives (at 402) mesh model 401 of a 3D object and point cloud 403 of the 3D object. Mesh model 401 constructs the shape and form of the 3D object with connected sets of meshes (e.g., triangles) that may have the same shape and/or size. The number of meshes as well as their sizes and shapes define the level-of-detail that is represented through mesh model 401. For instance, fewer and larger meshes produce a lower level-of-detail because they will be unable to create all the curves, angles, and/or other complex shapes of the 3D object, whereas more and smaller meshes produce a higher level-of-detail because they will be able to create or better mirror the curves, angles, and/or other complex shapes that could not be created with the fewer and larger meshes.

Graphics system 200 aligns (at 404) mesh model 401 with point cloud 403. The alignment include matching up common points-of-reference, structures, or features of mesh model 401 and point cloud 403.

Graphics system 200 analyzes the point cloud for regions-of-interest. The analysis may include comparing the values defined for positional and/or non-positional elements of the point cloud points in different regions of point cloud 403 relative to one another, or comparing the values defined for the points to the corresponding values (e.g., positional value or color values) of aligned meshed from mesh model 401. In any case, the analysis involves computing a different or standard deviation for values of the points in different regions of point cloud 403. Based on the analysis, graphics system 200 identifies (at 406) first region 405 that has a first standard deviation or computed difference that satisfies criteria for a first region-of-interest by a first threshold or amount, second region 407 that has a second standard deviation or computed difference that does not satisfy the criteria for a region-of-interest, and third region 409 that has a third standard deviation or computed difference that satisfies the criteria for a second region-of-interest by a second threshold or amount.

Graphics system 200 applies (at 408) a first mesh reconstruction to first region 405. The first mesh reconstruction includes defining a first reduced mesh size and a first increased number of meshes for representing first region 405 based on the first standard deviation or computed difference satisfying the criteria by the first threshold or amount. The first mesh reconstruction redefines first region 405 with more meshes that more accurately represent the curvature, depth, and/or dimensionality of the first region from the 3D object.

Graphics system 200 does not change the meshes that are defined and that represent second region 407. Specifically, second region 407 is determined to not be a region-of-interest and no additional detail is required for that region based on the point cloud analysis.

Graphics system 200 applies (at 410) a second mesh reconstruction to third region 409. The second mesh reconstruction includes defining a second reduced mesh size and a second increased number of meshes for representing third region 409 based on the second standard deviation or computed difference satisfying the criteria by the second threshold or amount.

Graphics system 200 redefines (at 412) mesh model by replacing the original meshes that defined those regions-of-interest in mesh model 401 with the meshes from each reconstructed region (e.g., first region 405 and third region 409). In doing so, graphics system 200 selectively increases the detail, depth, dimensionality, resolution, and realism of mesh model 401 in the regions-of-interest that represent complex shapes and forms of the 3D object. Specifically, graphics system 200 selectively increases the resolution and detail based on the variation that is captured in a point cloud scan of those same regions.

Figure 5:
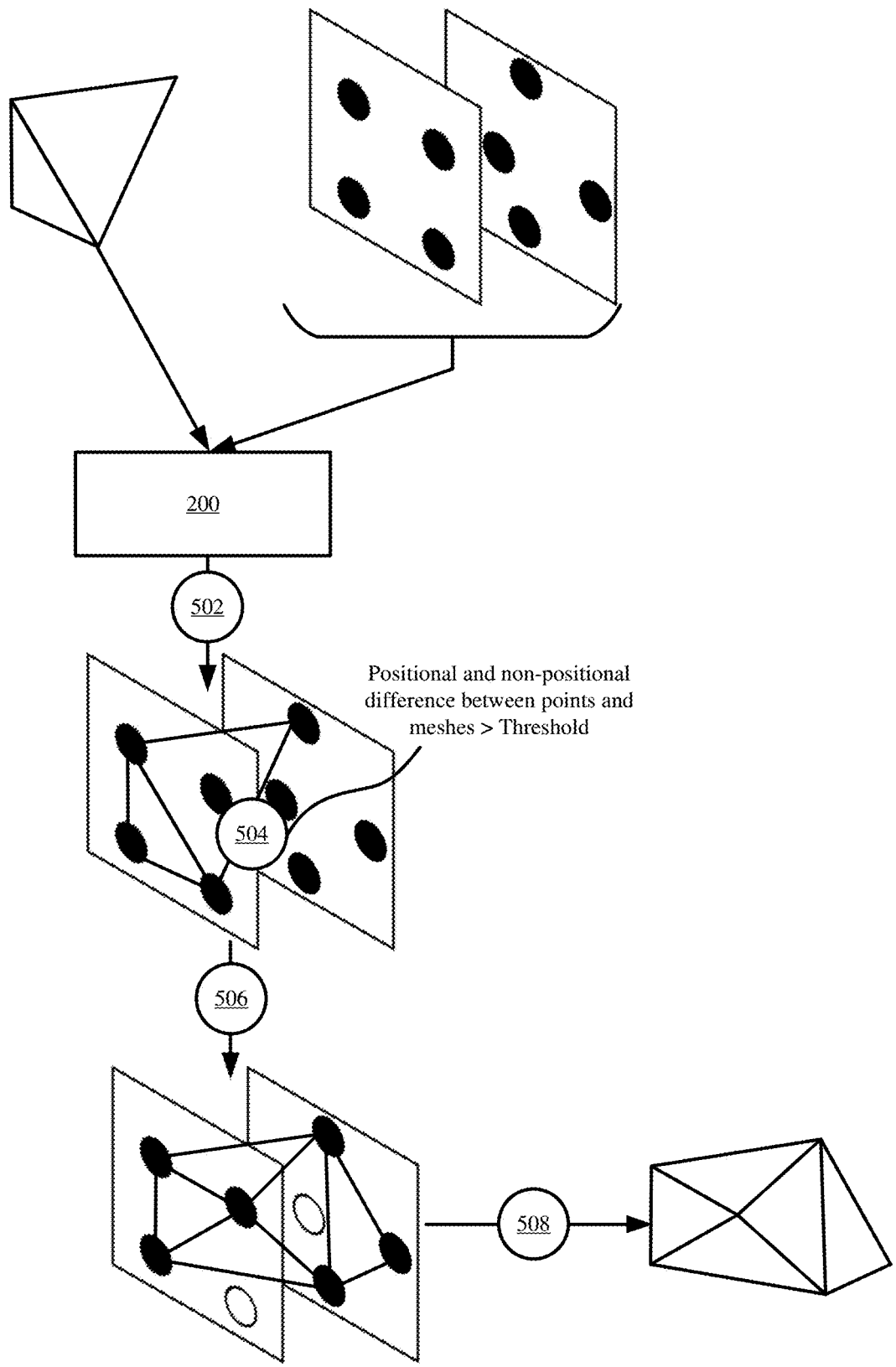
FIG. 5 illustrates an example of applying a mesh reconstruction based on a selective sampling of point cloud points in accordance with some embodiments presented herein.

FIG. 5 illustrates an example of applying a mesh reconstruction based on a selective sampling of point cloud points in accordance with some embodiments presented herein. Graphics system 200 aligns (at 502) and compares a set of meshes to a set of points that represent a same region of a 3D object in a mesh model and in a point cloud.

The set of meshes are defined from a first sampling of the set of points. For example, graphics system 200 may define a vertex for each mesh using every other point of the point cloud such that the set of meshes would be defined based on one half of the set of points representing the same region in the point cloud. Continuing with the example, the mesh model may have half the detail or resolution as the point cloud.

Graphics system 200 determines (at 504) that the represented region is a region-of-interest based on the density, variety, and/or other characteristics of the set of points and/or based on the comparison between the set of points and the set of meshes. In other words, graphics system 200 determines that the region contains visual data that is lost or that is not accurately portrayed by the current set of meshes because of computed positional and/or non-positional differences between the set of points and the set of meshes, and that additional meshes are required to more closely or accurately present the visual data for the region in the mesh model.

Graphics system 200 performs (at 506) the mesh reconstruction of the region-of-interest. Performing (at 506) the mesh reconstruction includes increasing the level-of-detail with which the region is represented in the mesh model by using smaller meshes and/or more meshes to more accurately capture the detail, angles, shapes, forms, and/or features of the region from the 3D object in the mesh model.

Performing (at 506) the mesh reconstruction includes selecting a second sampling of the set of points from which to define a second set of meshes. The second sampling includes more points than the first sampling. For instance, the first sampling may select every other point in the region as a mesh vertex, whereas the second sampling may select two out of every three points in the region as a mesh vertex.

Additionally, graphics system 200 may select the second sampling of points based on values defined for their positional and/or non-positional elements. Specifically, graphics system 200 samples the points that preserve the most visual data from the region. The sampling may include identifying and selecting the points that have the greatest variation in their positioning, and therefore capture the different detail, angles, shapes, forms, and/or features throughout the region. The sampling may also include identifying and selecting the points that have the greatest difference in their positional and/or non-positional elements. The number of points selected for the second sampling may be determined based on the standard deviation or difference detected between the set of points and the set of meshes that initially represented the region.

Graphic system 200 generates (at 508) a second set of meshes using the second sampling of points as mesh vertices. Since the second sampling includes more points than the first sampling, the mesh reconstruction includes defining more meshes that may be smaller in size than the set of meshes that initially represented the region. Consequently, the second set of meshes capture more of the detail in the shapes and forms from the region of the 3D object than the initial or first set of meshes. The resolution and accuracy of the mesh model is increased without unnecessarily adding meshes throughout the mesh model and/or increasing the resolution across the entire mesh model. Moreover, the detail and accuracy of the mesh model are increased to better match the detail and accuracy of the point cloud without converting the mesh model to a point cloud and by preserving the ability to process, manipulate, and render the mesh model using graphics hardware and software that are optimized for meshes but not point clouds.

In some embodiments, the mesh reconstruction may be performed using one or more reference point clouds. In some such embodiments, the mesh model may be created for a 3D object. However, a point cloud may not have been generated or may not exist for that 3D object. In this case, graphics system 200 may classify the object type, may select reference point clouds for the classified object type, and may perform the mesh reconstruction based on the selected reference point clouds. The reference point clouds may be used to increase the resolution and/or level-of-detail of mesh models without having to individually scan and generate a point cloud for the 3D object of each mesh model.

For instance, generic mesh models that approximate the shape and form of a tree may be digitally created. The mesh models may lack the realism and detail of an actual tree because the meshes may provide a flattened two-dimensional or blocky look to the trees that do not accurately portray the bark texture, the leaf detail, branch depth and distribution, etc. Accordingly, graphics system 200 may obtain highly-detailed point clouds of a particular type of tree, and may sample different sets of points from the highly-detailed point clouds in order to introduce and/or incorporate the tree detail (e.g., bark texture, leaf detail, branch depth and distribution, etc.) into the mesh models.

Figure 6:
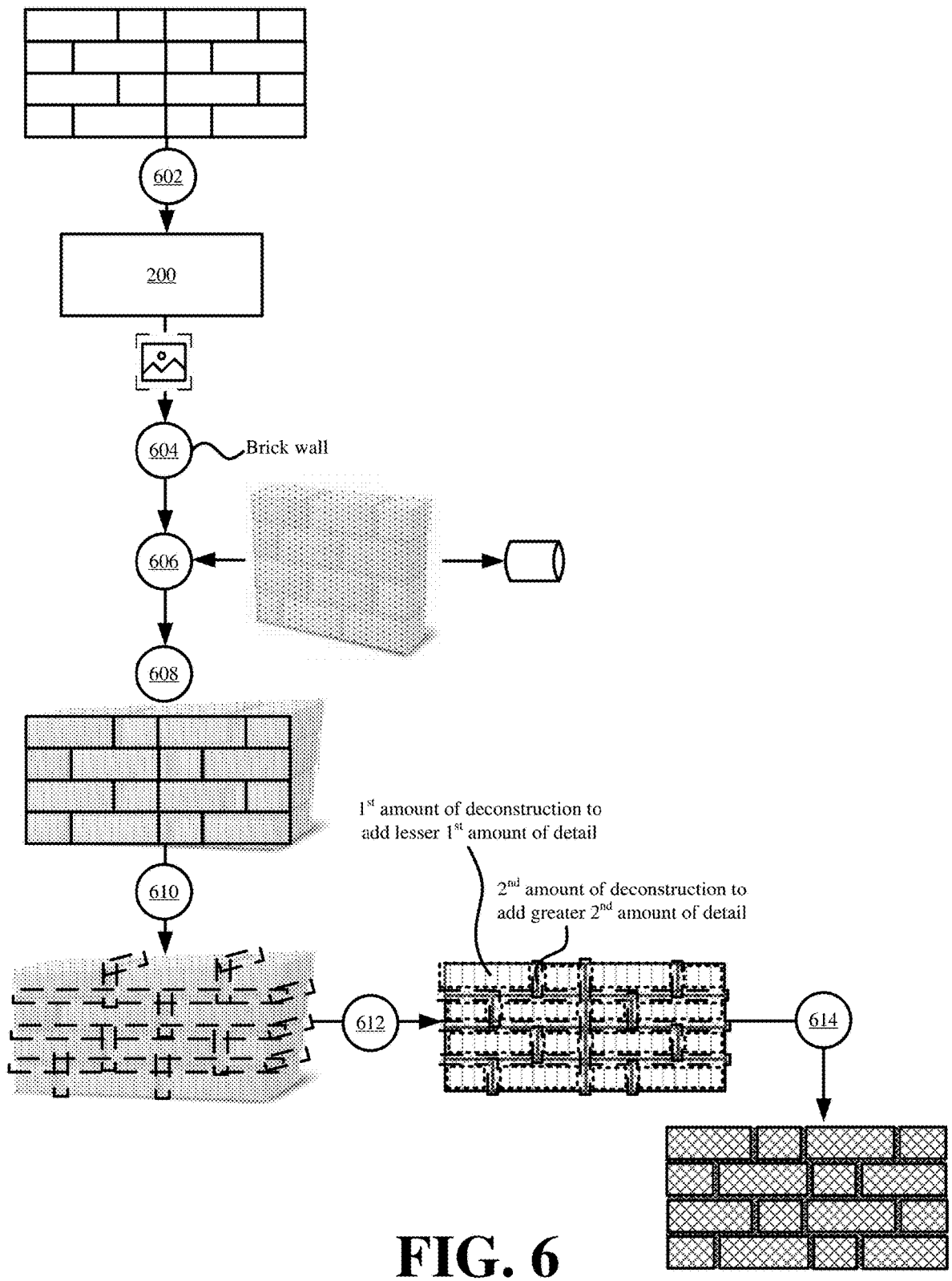
FIG. 6 illustrates an example of performing the mesh reconstruction based on one or more reference point clouds in accordance with some embodiments.

FIG. 6 illustrates an example of performing the mesh reconstruction based on one or more reference point clouds in accordance with some embodiments. Graphics system 200 receives (at 602) a mesh model of a 3D object. The mesh model is defined with a first set of meshes that render the 3D object with a first level-of-detail and/or at a first resolution.

No point cloud or depth scan of the 3D object may exist. For instance, the 3D object may not have been scanned with LiDAR or another 3D sensor in order to have generated the point cloud. In some embodiments, the mesh model may be for a digitally created 3D object that is not a physical 3D object that can be scanned.

Graphics system 200 performs object recognition, and classifies (at 604) the 3D object represented by the mesh model. Graphics system 200 may use one or more artificial intelligence and/or machine learning techniques ("AI/ML") to determine the object represented by the shape and form of the mesh model. The AI/ML techniques may receive labeled 2D or 3D images of different objects, may detect positional and/or non-positional commonality that is unique to each object, and may define object recognition models to classify the objects based on the unique commonality detected for each object. In some embodiments, performing object recognition includes rendering the mesh model, and using image recognition algorithms to detect the represented object.

Graphics system 200 retrieves (at 606) one or more reference point clouds for the classified 3D object. Each reference point cloud is a point cloud that is generated from scanning a similar type of object as the classified 3D object. For instance, the mesh model may represent a brick wall. However, the mesh model may fail to capture the depth or grooves in the spaces separating the bricks and/or the individual brick textures. The one or more reference point clouds may provide high resolution scans of similar brick walls that precisely capture and represent the depth or grooves between the bricks and/or the individual brick textures.

Graphics system 200 aligns (at 608) the one or more reference point clouds with the mesh model. Aligning (at 608) The one or more reference point clouds includes resizing, scaling, rotating, and/or otherwise transforming the one or more reference point clouds to align significant features of the one or more reference point clouds with the same features of the mesh model.

Graphics system 200 detects (at 610) regions-of-interest within the mesh model based on a standard deviation or difference calculation performed based on the reference point cloud data with or without comparison to the mesh model data. For instance, graphics system 200 may analyze the one or more reference point clouds to detect regions with a higher density of points, points that have greater positional or non-positional variety (e.g., transitions between bricks and mortar), and/or other differences from other regions.

Graphics system 200 determines (at 612) a mesh reconstruction for the subsets of meshes from the mesh model that align with and/or represent the regions-of-interest based on the standard deviation or difference computed for each region-of-interest. Specifically, graphics system 200 determines (at 612) a greater mesh reconstruction for a first subset of meshes in a first region-of-interest that have a smaller positional deviation from the mean of the points of the reference point clouds representing the first region-of-interest than a second subset of meshes in a second region-of-interest that have a larger positional deviation from the mean of the points of the reference point clouds representing the second region-of-interest.

Graphics system 200 modifies (at 614) the subset of meshes within each region-of-interest according to the mesh reconstruction that is determined (at 612) for that region-of-interest and the reference point cloud data. Modifying (at 614) the subset of meshes includes adding new meshes to represent each region-of-interest with more facets that increase the depth, dimensionality, detail, and/or realism for that region-of-interest. Modifying (at 614) the subset of meshes may further include adjusting the positioning of the mesh vertices to more accurately align with the positioning of a sampling of points from the reference point clouds. For instance, the mesh model may be flat mesh representation of a brick wall. Modifying (at 614) the subset of meshes may include adding new meshes and repositioning the mesh vertices so that depth is introduced for the spaces or grooves that represent the mortar separating the bricks and additional depth is introduced to recreate the rough texture about the surface of each brick according to the positional differences that are defined for those regions-of-interest in the reference point clouds.

Figure 7:
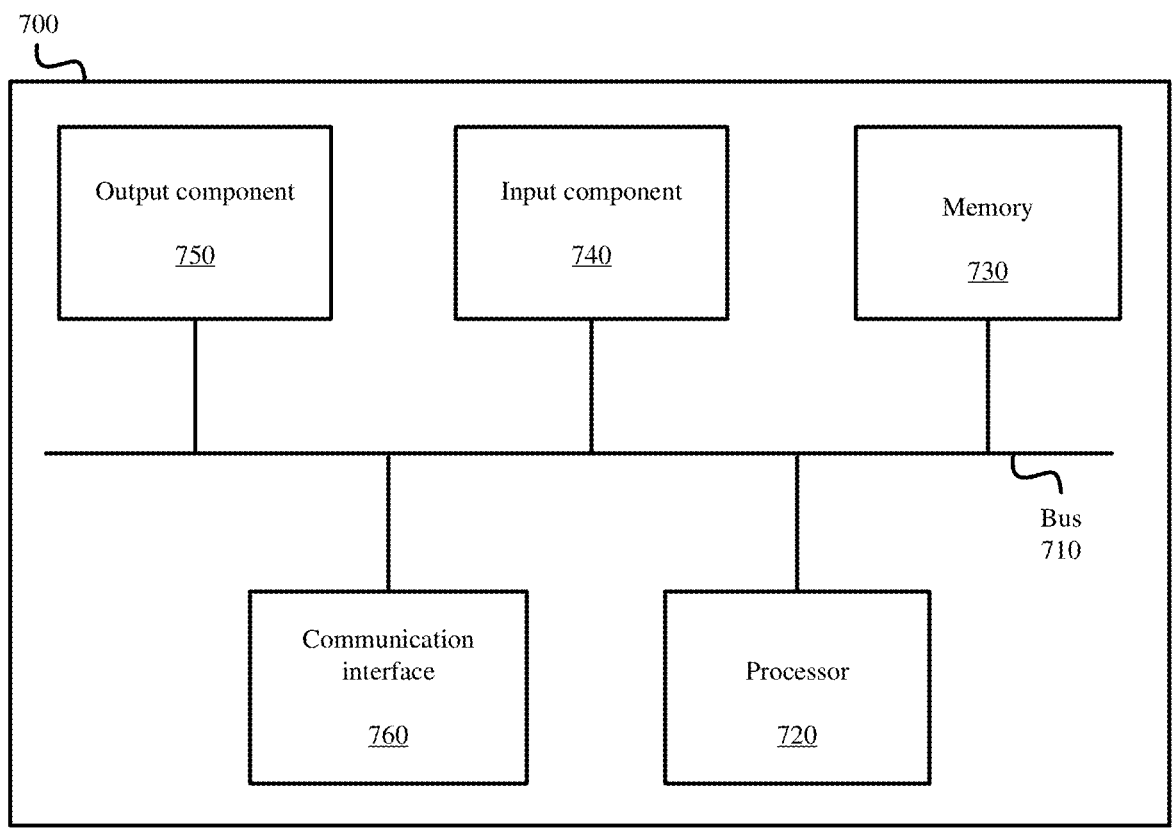
FIG. 7 illustrates example components of one or more devices, according to one or more embodiments described herein.

FIG. 7 is a diagram of example components of device 700. Device 700 may be used to implement one or more of the devices or systems described above (e.g., graphics system 200). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
  receiving a mesh model of a three-dimensional ("3D") object, the mesh model comprising a plurality of polygons that are connected to one another and that collectively form a shape of the 3D object at a first level-of-detail;
  receiving a point cloud comprising a plurality of points that are disconnected from one another, that are distributed in a 3D space,_ and that collectively form the shape of the 3D object at a second level-of-detail that is greater than the first level-of-detail, wherein each point of the plurality of points comprises positional elements that define a position of that point in the 3D space;
  determining a particular region-of-interest of the 3D object based in part on the positional elements of a set of points from the plurality of points that represent part or all of the particular region-of-interest in the point cloud differing by more than a threshold amount from one another or from positions of a first set of polygons from the plurality of polygons that represent part or all of the particular region-of-interest in the mesh model;
  reconstructing the particular region-of-interest in the mesh model by modifying the first set of polygons to a second set of polygons based on the positional elements of two or more of the set of points, wherein the second set of polygons comprises more polygons than the first set of polygons and other regions of the mesh model matching a size of the particular region-of-interest, and wherein polygons of the second set of polygons are smaller in size than polygons of the first set of polygons and other polygons of the plurality of polygons; and
  generating a modified mesh model of the 3D object in response to reconstructing the particular region-of-interest, wherein the modified mesh model comprises different sets of the plurality of polygons that represent a plurality of regions of the 3D object other than the particular region-of-interest at the first level-of-detail and the second set of polygons that represent the particular region-of-interest at a third level-of-detail that is greater than the second level-of-detail.

2. The method of claim 1 further comprising:
  sampling a first subset of points from the set of points that represent the particular region-of-interest;
  generating the first set of polygons based on the positional elements of the first subset of points; and
  wherein reconstructing the particular region-of-interest comprises:
    sampling a second subset of points from the set of points that comprises more points than the first subset of points; and
    generating the second set of polygons based on the positional elements of the second subset of points.

3. The method of claim 2,
  wherein generating the first set of polygons comprises defining vertices of the first set of polygons at positions defined by the positional elements of the first subset of points; and
  wherein generating the second set of polygons comprises defining vertices of the second set of polygons at positions defined by the positional elements of the second subset of points.

4. The method of claim 1 further comprising:
  aligning the mesh model with the point cloud, wherein said aligning comprises:
    identifying common features within the mesh model and the point cloud; and
    transforming one or more of the mesh model or the point cloud so that the common features in the mesh model are at similar positions as the common features in the point cloud.

5. The method of claim 1, wherein reconstructing the particular region-of-interest comprises:
  selecting a subset of points from the set of points that represent different depths of the particular region-of-interest; and
  defining the second set of polygons based on the positional elements of the subset of points.

6. The method of claim 1, wherein reconstructing the particular region-of-interest comprises:
  selecting a subset of points from the set of points that present the particular region-of-interest in the point cloud at the third level-of-detail; and
  defining the second set of polygons based on the positional elements of the subset of points.

7. The method of claim 1,
  wherein smaller polygons of the second set of polygons recreate more angles and shapes of the particular region-of-interest than larger polygons of the first set of polygons.

8. The method of claim 1, wherein reconstructing the particular region-of-interest comprises:
  defining additional polygon vertices amongst polygon vertices of the first set of polygons; and
  generating the second set of polygons using the additional polygon vertices and the polygon vertices of the first set of polygons.

9. The method of claim 1, wherein generating the modified mesh model comprises:
  replacing the first set of polygons with the second set of polygons.

10. The method of claim 1 further comprising:
  determining a second region-of-interest of the 3D object based in part on differences in the positional elements of a different second set of points from the plurality of points that represent part or all of the second region-of-interest in the point cloud being greater than the differences in the positional elements of the set of points representing the particular region-of-interest; and
  reconstructing the second region-of-interest in the mesh model by modifying a third set of polygons from the plurality of polygons that represent the second region-of-interest in the mesh model to a fourth set of polygons based on the positional elements of two or more of the different second set of points, wherein the fourth set of polygons comprises more polygons than the second set of polygons and represents the second region-of-interest at a fourth level-of-detail that is greater than the third level-of-detail of the particular region-of-interest.

11. The method of claim 1, wherein determining the particular region-of-interest comprises:
   determining that the first set of polygons do not recreate one or more curves, angles, depths, or dimensionality created by the set of points.

12. The method of claim 1, wherein determining the particular region-of-interest comprises:
   computing a mean position based on the positional elements of the set of points;
   computing a difference between a position of a particular polygon from the first set of polygons and the mean position; and
   defining an amount by which to reconstruct the particular polygon based on the difference between the position of the particular polygon and the mean position.

13. The method of claim 1, wherein determining the particular region-of-interest comprises:
   computing a standard deviation between the first set of polygons and the set of points; and
   defining an amount by which to reconstruct the particular region-of-interest based on the standard deviation.

14. A graphics system comprising:
   one or more hardware processors configured to:
      receive a mesh model of a three-dimensional ("3D") object, the mesh model comprising a plurality of polygons that are connected to one another and that collectively form a shape of the 3D object at a first level-of-detail;
      receive a point cloud comprising a plurality of points that are disconnected from one another, that are distributed in a 3D space, and that collectively form the shape of the 3D object at a second level-of-detail that is greater than the first level-of-detail, wherein each point of the plurality of points comprises positional elements that define a position of that point in the 3D space;
      determine a particular region-of-interest of the 3D object based in part on the positional elements of a set of points from the plurality of points that represent part or all of the particular region-of-interest in the point cloud differing by more than a threshold amount from one another or from positions of a first set of polygons from the plurality of polygons that represent part or all of the particular region-of-interest in the mesh model;
      reconstruct the particular region-of-interest in the mesh model by modifying the first set of polygons to a second set of polygons based on the positional elements of two or more of the set of points, wherein the second set of polygons comprises more polygons than the first set of polygons and other regions of the mesh model matching a size of the particular region-of-interest, and wherein polygons of the second set of polygons are smaller in size than polygons of the first set of polygons and other polygons of the plurality of polygons; and
      generate a modified mesh model of the 3D object in response to reconstructing the particular region-of-interest, wherein the modified mesh model comprises different sets of the plurality of polygons that represent a plurality of regions of the 3D object other than the particular region-of-interest at the first level-of-detail and the second set of polygons that represent the particular region-of-interest at a third level-of-detail that is greater than the second level-of-detail.

15. The graphics system of claim 14, wherein the one or more hardware processors are further configured to:
   sample a first subset of points from the set of points that represent the particular region-of-interest;
   generate the first set of polygons based on the positional elements of the first subset of points; and
   wherein reconstructing the particular region-of-interest comprises:
      sampling a second subset of points from the set of points that comprises more points than the first subset of points; and
      generating the second set of polygons based on the positional elements of the second subset of points.

16. The graphics system of claim 15,
   wherein generating the first set of polygons comprises defining vertices of the first set of polygons at positions defined by the positional elements of the first subset of points; and
   wherein generating the second set of polygons comprises defining vertices of the second set of polygons at positions defined by the positional elements of the second subset of points.

17. The graphics system of claim 14, wherein the one or more hardware processors are further configured to:
   align the mesh model with the point cloud, wherein said aligning comprises:
      identifying common features within the mesh model and the point cloud; and
      transforming one or more of the mesh model or the point cloud so that the common features in the mesh model are at similar positions as the common features in the point cloud.

18. The graphics system of claim 14, wherein reconstructing the particular region-of-interest comprises:
   selecting a subset of points from the set of points that represent different depths of the particular region-of-interest; and
   defining the second set of polygons based on the positional elements of the subset of points.

19. The graphics system of claim 14, wherein reconstructing the particular region-of-interest comprises:
   selecting a subset of points from the set of points that present the particular region-of-interest in the point cloud at the third level-of-detail; and
   defining the second set of polygons based on the positional elements of the subset of points.

20. A method comprising:
   receiving a mesh model of a three-dimensional ("3D") object, the mesh model comprising a plurality of meshes that collectively form a shape of the 3D object at a first level-of-detail;
   receiving a point cloud comprising a plurality of points that are distributed in a 3D space and that collectively form the shape of the 3D object with greater detail than the first level-of-detail, wherein each point of the plurality of points comprises positional elements that define a position of that point in the 3D space;
   determining a first region-of-interest of the 3D object based in part on differences in the positional elements of a first set of points from the plurality of points that represent part or all of the first region-of-interest in the point cloud;
   reconstructing the first region-of-interest in the mesh model by modifying a first set of meshes from the plurality of meshes that represent the first region-of-interest in the mesh model to a second set of meshes based on the positional elements of two or more of the first set of points, wherein the second set of meshes comprises more meshes than the first set of meshes and represents the first region-of-interest at a second level-of-detail that is greater than the first level-of-detail;

determining a second region-of-interest of the 3D object based in part on differences in the positional elements of a different second set of points from the plurality of points that represent part or all of the second region-of-interest in the point cloud being greater than the differences in the positional elements of the first set of points representing the first region-of-interest;

reconstructing the second region-of-interest in the mesh model by modifying a third set of meshes from the plurality of meshes that represent the second region-of-interest in the mesh model to a fourth set of meshes based on the positional elements of two or more of the different second set of points, wherein the fourth set of meshes comprises more meshes than the second set of meshes and represents the second region-of-interest at a third level-of-detail that is greater than the second level-of-detail of the first region-of-interest; and generating a modified mesh model of the 3D object in response to reconstructing the first region-of-interest and the second region-of-interest, wherein the modified mesh model comprises different sets of the plurality of meshes that represent a plurality of regions of the 3D object other than the first region-of-interest and the second region-of-interest at the first level-of-detail, the second set of meshes that represent the first region-of-interest at the second level-of-detail, and the fourth set of meshes that represent the second region-of-interest at the third level-of-detail.

\* \* \* \* \*